A. RIDD.
MILKING MACHINE RELEASER.
APPLICATION FILED SEPT. 19, 1914.
1,247,329.
Patented Nov. 20, 1917.
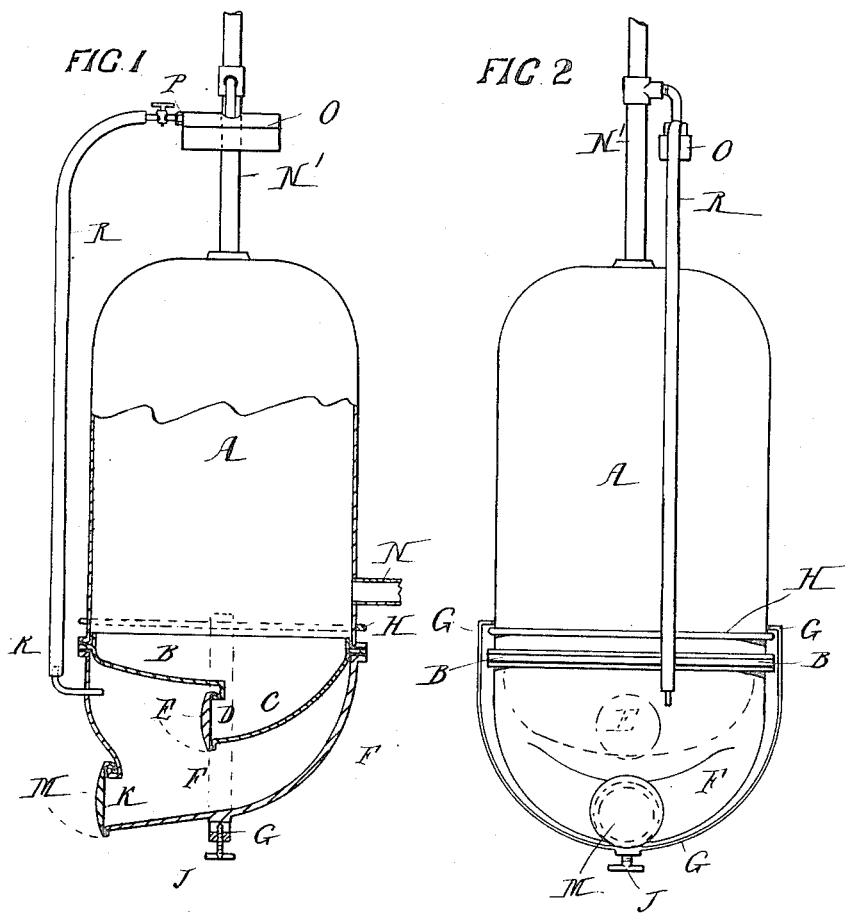
WITNESSES
INVENTOR
AMBROSE RIDD
ATTORNEY

UNITED STATES PATENT OFFICE.

AMBROSE RIDD, OF NEW PLYMOUTH, NEW ZEALAND, ASSIGNOR TO THE RIDD MILKING MACHINE COMPANY, LIMITED, OF NEW PLYMOUTH, NEW ZEALAND.

MILKING-MACHINE RELEASER.

1,247,329.

Specification of Letters Patent.  Patented Nov. 20, 1917.

Application filed September 19, 1914. Serial No. 862,497.

*To all whom it may concern:*

Be it known that I, AMBROSE RIDD, subject of the King of Great Britain, residing at New Plymouth, in the Dominion of New Zealand, have invented a new and useful Improvement in Milking-Machine Releasers; and I do hereby declare the following to be a full, clear, and exact description of the same.

This invention relates to the appliances used in milking machine installations for the purpose of automatically releasing the milk from the main milk flow pipe used for the conveyance of the milk from the several cows. This milk is drawn along such pipe under the action of suction produced by connection with a source of vacuum and the present releaser in its operation is designed to receive the milk from such pipe and to deliver it into suitable receptacles without interfering with the continuity of such vacuum action and the consequent flow of the milk.

The means devised for carrying out this purpose relate to that class consisting broadly of a two chambered vessel, one chamber being placed above the other and being interposed into the milk and vacuum pipe line so that it will receive the milk constantly. An outlet is provided in the bottom of this receiving chamber and which outlet is kept normally closed by a gravity flap valve adapted to open outward. The lower chamber fits over the bottom of the receiving chamber and it also is provided with an outlet in its bottom kept normally closed by a gravity flap valve adapted to open outward. An automatic pulsator of any of the well known constructions is connected with the vacuum main and with the lower chamber, so that such pulsator shall in its operation connect the lower chamber alternately with the vacuum pipe and with air. When this chamber is connected with vacuum the air conditions of both chambers are in equilibrium so that any milk contained in the upper chamber will by its weight force the discharge valve open and flow into the lower chamber the discharge valve of such lower chamber being kept closed by the air pressure outside. Then when air is admitted to the lower chamber the air conditions in the two chambers will be varied so that the air pressure in the lower chamber and the vacuum in the upper chamber will close the discharge valve of the latter chamber allowing the milk to again collect within it. At the same time the air pressure in the lower chamber will permit the milk that has been discharged therein, to force its discharge valve open and to flow into a receptacle placed below to receive it.

The invention consists in certain details of construction by which the manipulation and cleansing of the different parts are made easy.

In fully describing the invention reference will be made to the accompanying sheet of drawings, in which:—

Figure 1 is a part side elevation and part sectional elevation of the complete releaser.

Fig. 2 is a front elevation of the same.

A is the receiving chamber which is made preferably of cylindrical form having a permanently closed top end and an open bottom end. This bottom end is however provided with a cover B fitting closely on to it and adapted to make an airtight connection. The cover is formed with a well or depression C in it and with a discharge opening D opening horizontally from such depression. This opening is covered by the flap valve E hung upon its outside so that it may swing out and in but which is so hung as to normally close the opening by its own weight.

F is the lower chamber the top of which is left open and which is adapted to fit closely around the edge of the cover B in the manner shown in the drawings. The cover B and this chamber are then kept in position upon the chamber A by means of the bow clamp G passing beneath the center of the chamber F and engaging at its two ends with the collar or ring H upon the outside of the chamber A, and the clamping screw J that is threaded through the bow and engages the chamber F and thereby draws the joints between the cover and the two chambers closely together. Rubber packing is preferably placed between these joints.

The lower chamber F is formed with the horizontal discharge outlet K that is controlled by means of the flap valve M hung upon its outside face and which also is so hung as to normally close the outlet.

The milk pipe N is arranged to enter the chamber A near its bottom while the vacuum pipe N' is led away from the top of such chamber.

O is a pulsator appliance of any of the well known constructions used in milking machinery and of the class that are automatically operated by being connected with a source of vacuum. This pulsator is arranged upon the vacuum pipe N' and connected therewith so as to alternately connect the pipe P with air and with vacuum at predetermined intervals of time. This pipe P is connected with the lower chamber F by means of rubber hosing or other flexible piping R so as thereby to cause such chamber to be alternately exhausted of air and filled with it to operate the appliance in the manner before described.

It will be seen that the several parts composing the releaser may be readily taken apart for cleansing purposes by merely loosening the screw J and removing the bow clamp G. When cleansed they may then be readily re-assembled in their working positions.

What I do claim as my invention, and desire to secure by Letters Patent is:—

A milking machine releaser comprising an upper milk receiving chamber connected respectively with the milk pipe and the source of vacuum, a removable bottom fitting beneath such chamber, a gravity discharge valve in such bottom, a lower chamber fitted onto such bottom, a pulsator appliance connected with such lower chamber, a gravity discharge valve in the bottom of such lower chamber and means for clamping the two chambers together consisting of a bow clamp extending beneath the lower chamber, having inwardly extending lugs on its two ends, a ring fixed around the upper chamber over which said lugs extend, and a set screw passing up through the middle of the bow clamp and engaging the bottom of the lower chamber, substantially as specified.

In testimony whereof, I have signed this specification in the presence of two subscribing witnesses.

AMBROSE RIDD.

Witnesses:
KATHLEEN MARY BENNETT,
REGINALD HAROLD GEORGE.